United States Patent
Ye et al.

(10) Patent No.: US 8,345,808 B2
(45) Date of Patent: Jan. 1, 2013

(54) METHODS AND APPARATUS FOR NARROW BAND INTERFERENCE DETECTION AND SUPPRESSION IN ULTRA-WIDEBAND SYSTEMS

(75) Inventors: Zhenzhen Ye, Amherst, MA (US);
Chunjie Duan, Medfield, MA (US);
Philip Orlik, Cambridge, MA (US);
Jinyun Zhang, Cambridge, MA (US)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 746 days.

(21) Appl. No.: 12/385,078

(22) Filed: Mar. 30, 2009

(65) Prior Publication Data

US 2010/0246635 A1  Sep. 30, 2010

(51) Int. Cl.
*H03D 1/06* (2006.01)
(52) U.S. Cl. ........ 375/348; 375/346; 375/229; 375/290; 375/130
(58) Field of Classification Search .................. 375/130, 375/148, 142, 348, 346, 229, 290; 455/296, 455/307
See application file for complete search history.

(56) References Cited

U.S. PATENT DOCUMENTS

| | | | | |
|---|---|---|---|---|
| 4,412,340 A * | 10/1983 | Bartlett et al. | ................. | 375/343 |
| 5,325,204 A * | 6/1994 | Scarpa | ........................... | 348/607 |
| 5,852,630 A * | 12/1998 | Langberg et al. | ............. | 375/219 |
| 7,305,052 B2 * | 12/2007 | Spiridon et al. | .............. | 375/345 |
| 7,315,564 B2 * | 1/2008 | McCorkle | ..................... | 375/130 |
| 7,652,979 B2 * | 1/2010 | Arslan et al. | ................... | 370/208 |
| 2001/0050987 A1 * | 12/2001 | Yeap et al. | ............... | 379/399.01 |
| 2002/0071508 A1 * | 6/2002 | Takada et al. | ................. | 375/346 |
| 2003/0087622 A1 * | 5/2003 | Jayaraman et al. | ............ | 455/307 |
| 2008/0043888 A1 * | 2/2008 | Bhukania et al. | .............. | 375/346 |

OTHER PUBLICATIONS

Alemseged,Y.D. et al ("Two Stage Narrowband Interference Mitigation for Transmitted Reference UWB Systems", The 18th Annual IEEE International Symposium on Personal, Indoor and Mobile Radio Communications (PIMRC'07), Sep. 3-7, 2007, pp. 1-5).*
Kai Shi et al (US Impacts of narrowband interference on OFDM-UWB receivers: Anaylis and mitigation, IEEE Tranactions on signal processing, vol. 55, No. 3, Mar. 2007, pp. 1118-1128).*

(Continued)

*Primary Examiner* — Shuwang Liu
*Assistant Examiner* — Helene Tayong
(74) *Attorney, Agent, or Firm* — Buchanan Ingersoll & Rooney PC (57) ABSTRACT

An exemplary method is disclosed to accurately estimate the center frequency of a narrow-band interference (NBI). The exemplary method uses multi-stage autocorrelation-function (ACF) to estimate an NBI frequency. The exemplary method allows an accurate estimation of the center frequency of NBI in an Ultra-Wideband system. A narrow band interference (NBI) estimator based on such a method allows a low complexity hardware implementation. The exemplary method estimates the frequency in multiple stages. Each stage performs an ACF operation on the received signals. The first stage gives an initial estimation and the following stages refine the estimation. The results of all stages are combined to produce the final estimation. An apparatus based on such a multi-stage narrow band interference frequency detector is also disclosed to improve the accuracy by combining various filters with the detector.

8 Claims, 7 Drawing Sheets

Coexistence of a UWB system and a NBI source

OTHER PUBLICATIONS

Coulson, A., "Narrowband Interference in Pilot Symbol Assisted OFDM Systems", IEEE Transactions on Wireless Communications, vol. 3, No. 6, Nov. 2004, pp. 2277-2287.

Molisch, A.F. et al., "ChannelModels for Ultrawideband Personal Area Networks", IEEE Wireless Communications, Dec. 2003, pp. 14-21.

Shi, K. et al., "Impacts of Narrowband Interference on OFDM-UWB Receivers: Analysis and Mitigation", IEEE Transactions on Signal Processing, vol. 55, No. 3, Mar. 2007, pp. 1118-1128.

ECMA, "High Rate Ultra-Wideband PHY and MAC Standard", Standard ECMA-368, 2nd Ed., Dec. 2007.

* cited by examiner

Fig 1. Power Spectrum Density of Narrow band interference in a UWB system

Figure 4. Frequency estimation error

*Figure 5*

Combination with Adaptive Filter

Coexistence of a UWB system and a NBI source

METHODS AND APPARATUS FOR NARROW BAND INTERFERENCE DETECTION AND SUPPRESSION IN ULTRA-WIDEBAND SYSTEMS

TECHNICAL FIELD

The disclosure relates to wireless communication systems, and more particularly, to detecting and suppressing narrow band interference (NBI) in Ultra-Wideband (UWB) systems.

BACKGROUND INFORMATION

The Ultra-Wideband (UWB) technology can be used in many systems including high data-rate, short-range wireless personal network (WPAN) as well as highly accurate localization systems. There are three basic technologies: Multi-band orthogonal frequency division multiplexing (MB-OFDM) based, impulse radio based and direct spread spectrum sequence (DSSS). There are published international standards for communication systems based on UWB technologies which include ECMA-368, IEEE 802.15.4a etc.

A UWB system occupies a large bandwidth (>500 MHz) and therefore the probability of the existence of an in-band narrow-band interference is high. In addition, the signal power of the NBI is typically much higher than the UWB signal power. Therefore NBI causes significant performance degradation of the UWB system.

Conversely, a UWB system also becomes the interference source to narrow band systems. In many countries and regions, regulations require that UWB systems must be able to detect the existence of narrow band systems and avoid transmission on the frequencies occupied by the narrow band systems.

To guarantee the performance of UWB systems under NBI, it is important for a UWB transceiver to remove or reduce the power level of the NBI. To be able to detect the presence of NBI and estimate its frequency accurately is important in order to design a UWB transceiver with NBI cancellation/rejection capability.

As a majority of the UWB systems are projected to be used in applications where nodes are mobile, low cost and battery powered, it is essential that NBI detection/cancellation can be implemented in low complexity, low power hardware.

SUMMARY

Exemplary methods and program products are disclosed to accurately estimate the center frequency of a narrow-band interference (NBI). Such exemplary methods and program products use a multi-stage autocorrelation-function (ACF) to estimate an NBI frequency. The exemplary method allows an accurate estimation of the center frequency of NBI in a UWB system. A narrow band interference (NBI) estimator based on such a method allows a low complexity hardware implementation.

An exemplary multi-stage narrow band interference frequency detector estimates the frequency in multiple stages. Each stage performs ACF operation on the received signals. The first stage gives an initial estimation and the following stages refine the estimation. The results of all stages are combined to produce the final estimation.

Various exemplary methods, receivers and apparatus are disclosed to improve the accuracy by combining various exemplary receivers and adaptive filters with the aforementioned exemplary narrow-band interference (NBI) estimator.

DETAILED DESCRIPTION

Figure 1:
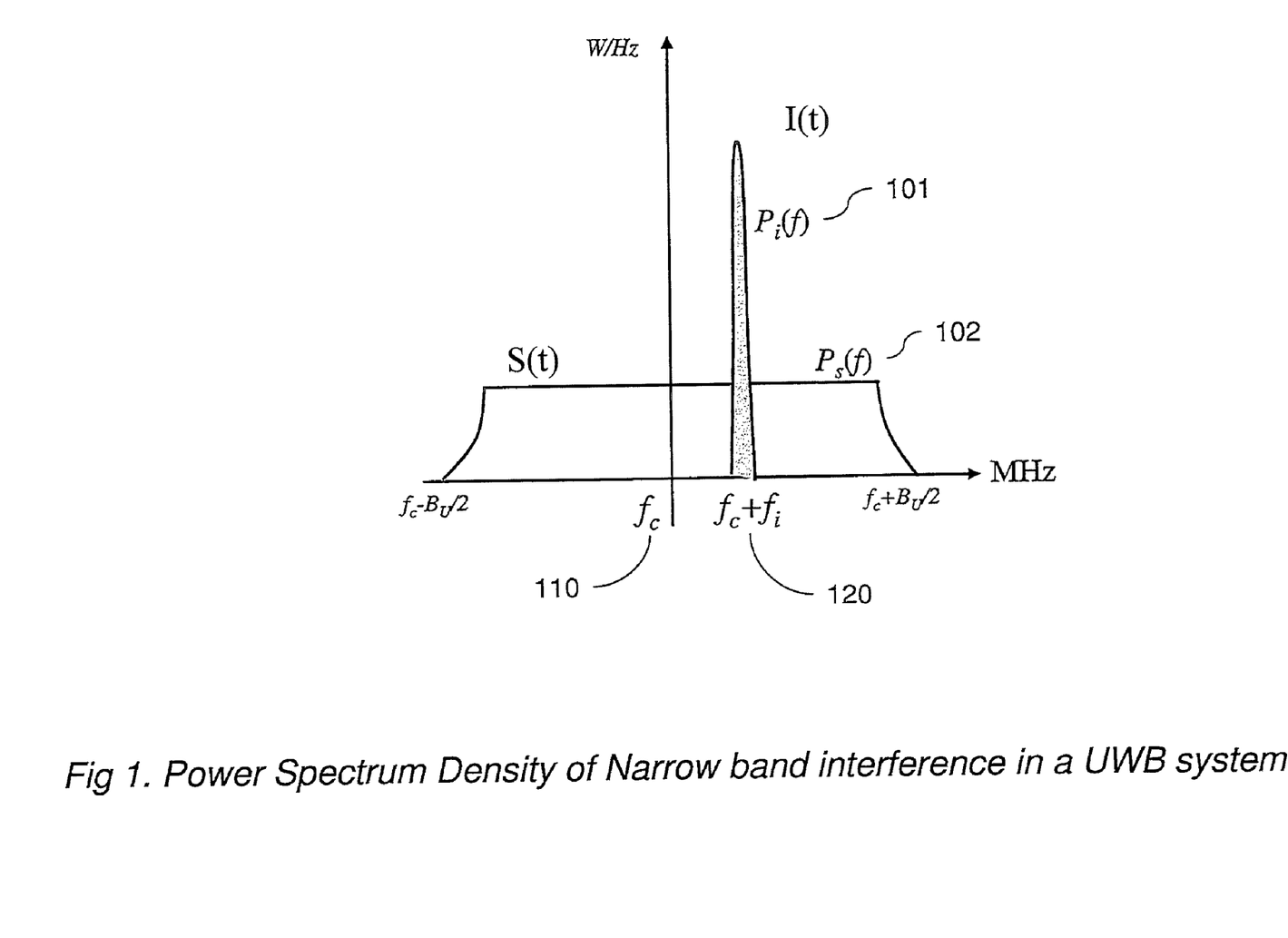
FIG. 1 shows an exemplary power spectrum density (PSD) of two signals. Ps(f) is the PSD of an Ultra-Wideband (UWB) signal S(t) with center frequency $f_c$ and bandwidth $B_u$.

FIG. 1 shows an exemplary power spectrum density (PSD) of two signals. Ps(f) 102 is the PSD of an Ultra-Wideband (UWB) signal S(t) with center frequency $f_c$ 110 and bandwidth $B_u$. The UWB signal spans from $f_c-B_u/2$ to $f_c+B_u/2$. The maximum signal power density is below the limit by regulations (e.g., −41 dBm/MHz in the U.S.). The narrow band signal I(t) has a spectrum of $P_i(f)$ 101. Its center frequency is $f_c+f_i$ 120 and the bandwidth $B_i$ satisfies $B_i \ll B_u$. Here $f_i$ is the offset between the center frequencies of the UWB signal and the NB signal. The power of the narrow band signal can be significantly higher than the power of the UWB signals. For example, the strength of an IEEE 802.11a signal can be as high as 20 dBm, where IEEE 802.11a is a standard that specifies an OFDM physical layer that splits an information signal across separate subcarriers to provide transmission of data.

Figure 2:
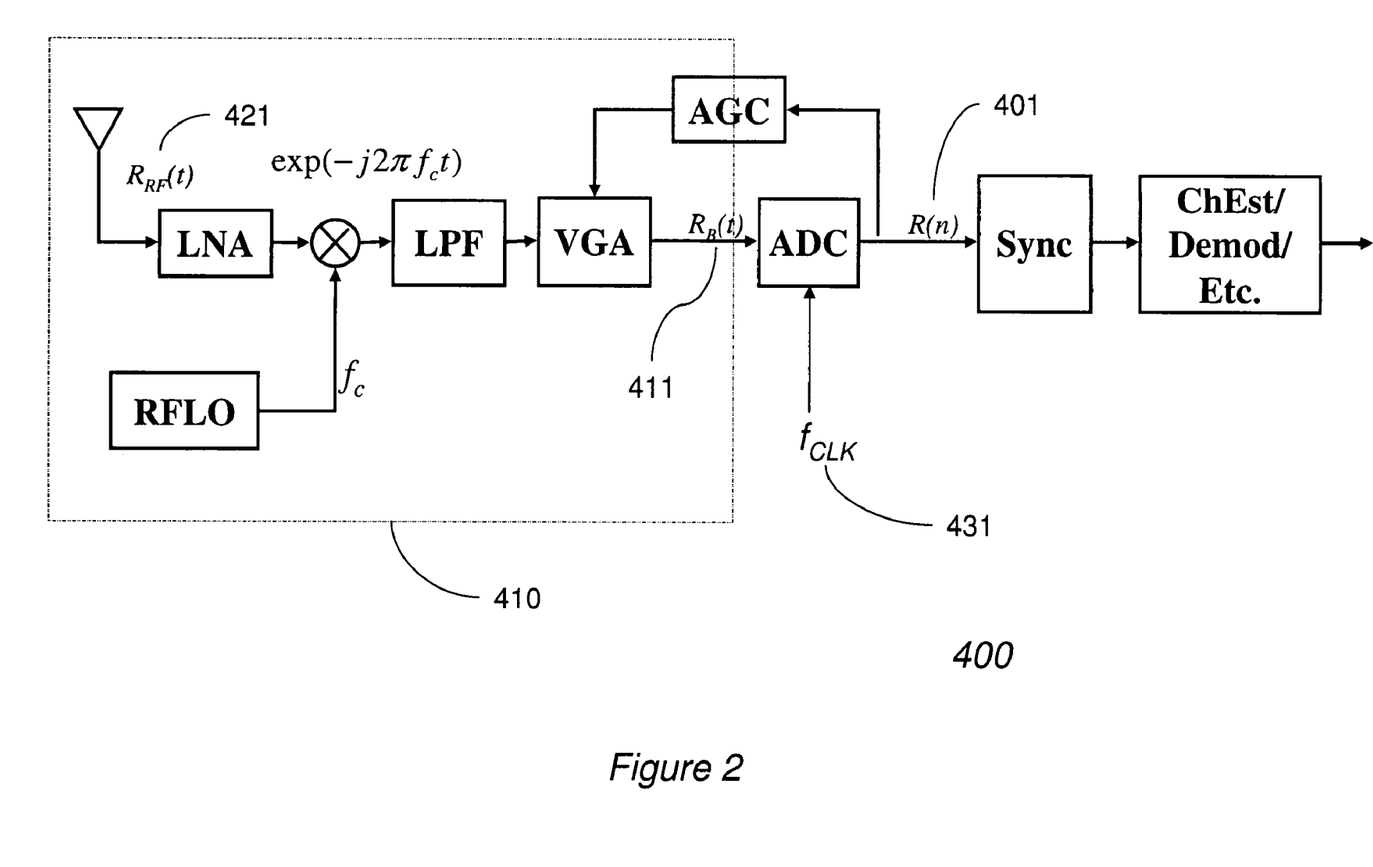
FIG. 2 is a the block diagram of a known UWB receiver.

FIG. 2 is a block diagram of a known UWB receiver 400. The radio frequency (RF) front end 410 converts the radio frequency signal $R_{RF}(t)$ 421 down to analog baseband signal $R_B(t)$ 411. While an analog to digital converter (ADC) is exemplified to further convert the signal to digital format, any variant of discrete received signal is represented by R(n) 401 with sampling interval of T (sampling frequency of f=1/T) based on $f_{CLK}$ 431. The digital functional blocks include synchronization (Sync), channel estimation, data demodulation, etc. A receiver typically also includes the automatic gain control (AGC) circuit to control a variable gain amplifier (VGA). The AGC circuit is partially or entirely implemented in the analog circuit.

At the presence of narrow-band interference (NBI), the discrete received signal R(n) 401 is the sum of the UWB signal S(n) and the interference signal I(n). R(n)=S(n)+I(n).

Figure 3:
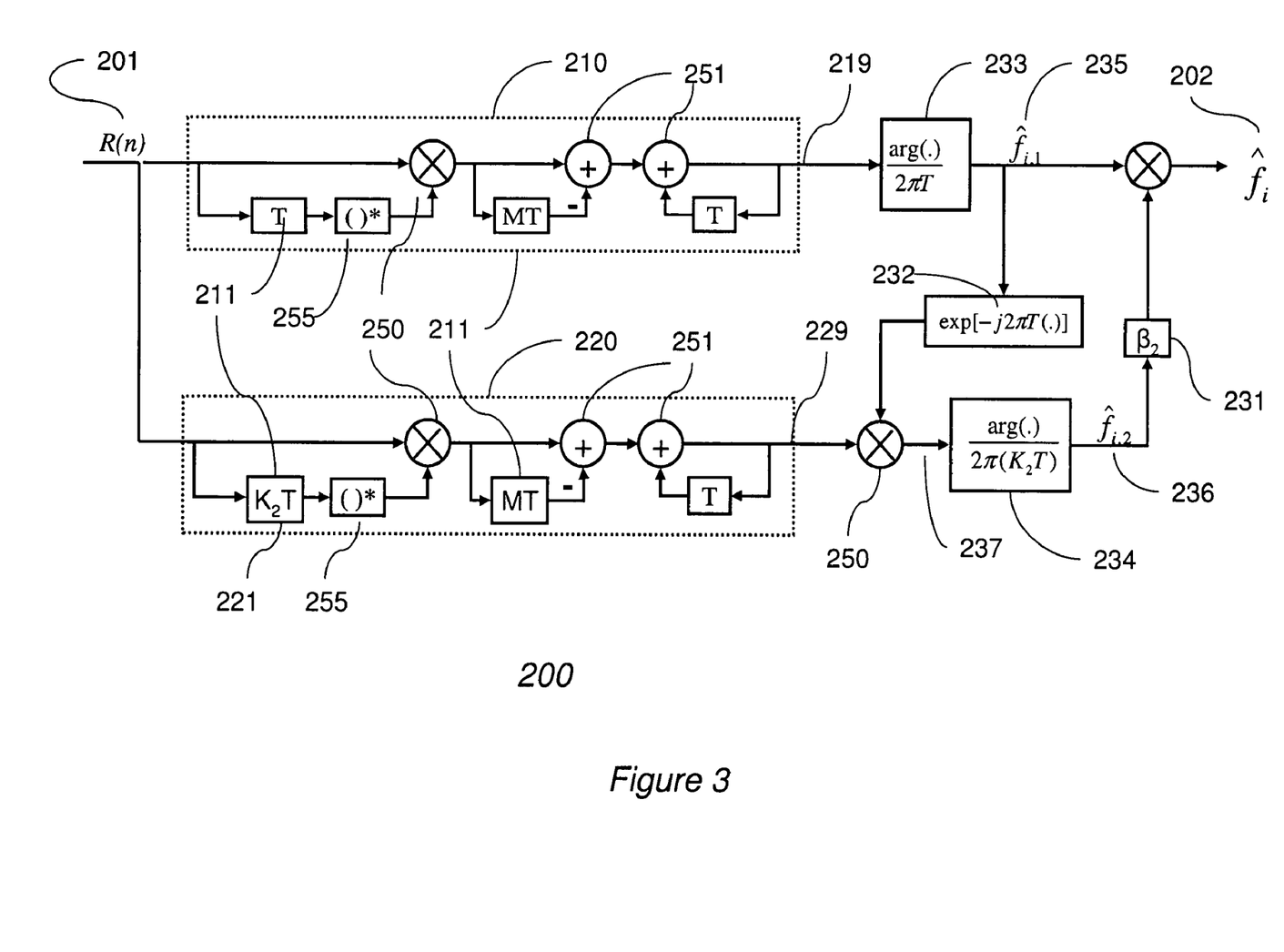
FIG. 3 is a block diagram of an exemplary embodiment of a narrow-band interference (NBI) frequency detector which outputs an estimate of the NBI frequency $\hat{f}_i$.

FIG. 3 is a block diagram of an exemplary embodiment of an NBI frequency detector. Such an NBI frequency detector 200 outputs an estimate of the NBI frequency $\hat{f}_i$ 202. Such an exemplary embodiment of an NBI frequency detector acquires and refines the estimation of NBI central frequency in multiple iterations (e.g., shown in FIG. 3 are two exemplary stages, each stage including a respective ACF unit 210 or 220).

The 1$^{st}$ stage (including a first ACF unit 210) produces an initial frequency estimate. Each following stage estimates the residue frequency with respect to the previous estimate. The output is a weighted combining of the estimation of all stages. The mathematical expression of the estimator output is $$\hat{f}_i = \sum_{g=1}^{S} \beta_g \hat{f}_{i,g} \quad (1)$$

where S is the total number of stages, $\hat{f}_{i,g}$ is the $g^{th}$ stage estimate and $\beta_g$ is a combining weight of the $g^{th}$ stage. $\beta_1$ is always set to 1, $\beta_g$ are values in [0,1] for g>1 and generally $\beta_g=1$.

The estimated frequency of the first stage (e.g., the output 235 represented by $\hat{f}_{i,1}$ based on an angular-function 233) is given as $$\hat{f}_{i,1} = \frac{1}{2\pi T} \arg\{ACF(m; M, 1)\} \quad (2)$$

and the frequency estimate of the $g^{th}$ stage (e.g., the output 236 represented by $\hat{f}_{i,g}$ based on an angular function 234) where g>1 is given as;

$$\hat{f}_{i,g} = \frac{1}{2\pi K_g T} \arg\left\{ ACF(m; M, K_g) \exp\left(-j2\pi K_g T \sum_{n=1}^{g-1} \hat{f}_{i,n}\right) \right\} \quad (3)$$

where $$\arg\left\{ ACF(m; M, K_g) \exp\left(-j2\pi K_g T \sum_{n=1}^{g-1} \hat{f}_{i,n}\right) \right\}$$

is the angular function that returns the angle of a complex number; ACF(m;M,K) is the autocorrelation function (ACF) defined as $$ACF(m; M, K) = \sum_{l=0}^{M-1} R(m+l) R^*(m+l+K) \quad (4)$$

where R(m+l) is the discrete received signal R at time instant m+l, m being the index of the first sample in the first segment, and l being an offset index; ( )* denotes the conjugation operator; K is referred as "lag"; and M is the "summation window size" of the ACF. Likewise, ACF(m;M,$K_g$) is an autocorrelation function based on parameters m, M and $K_g$ (the "lag" of stage g).

In an exemplary embodiment, a baseband signal can be sampled at, e.g., Nyquist frequency (which is generally true for a UWB transceiver), therefore the sampling interval of the ADC of the UWB receiver is T=1/$B_u$. An in-band NBI center frequency can be any value in the range [-$B_u$/2, $B_u$/2]. In order to detect NBI of any frequency in [-$B_u$/2, $B_u$/2], the first stage ACF lag must be 1 sample. The lag $K_S$ of the final stage ($K_g$, where g=S) shall satisfy max($B_i$)<1/$K_S$T. max($B_i$) indicates the maximum bandwidth of the detectable NBI. Also the lag $K_g$ of stage g needs to increase with g.

A detailed description of an exemplary embodiment of a 2-stage NBI frequency detector will be provided with reference to the detector 200 illustrated in FIG. 3. The discrete input signal R(n) 201 includes both the discrete (digitized) UWB signal S(n) and the discrete interference signal I(n). R(n)=S(n)+I(n). There are two ACF units in the detector 200. The first ACF unit 210 provides a recursive implementation of ACF(m;M,1) as follows, $$ACF(m; M, 1) = \sum_{l=0}^{M-1} R(m+l) R^*(m+l+1) \quad (5)$$
$$= R(m+M-1) R^*(m+M) - R(m-1) R^*(m) +$$
$$ACF(m-1; M, 1)$$

The $2^{nd}$ ACF unit 220 performs a recursive implementation of ACF(m;M,$K_2$).

The ACF stages shown in FIG. 3 include delay elements 211, 221, complex multipliers 250 and adders 251.

The angle of the $1^{st}$ stage ACF output 219 is $\hat{f}_{i,1}$ 235. The $2^{nd}$ stage ACF output 229 is rotated by $-j2\pi T \hat{f}_{i,1}$, (See, e.g., a complex exponential 232 driving a complex multiplier 250.) The angle of the rotated output is the estimated residual phase rotation and the residual frequency estimate is $\hat{f}_{i,2}$ 236 as expressed in Equation (3).

The estimated frequency $\hat{f}_i$ 202 is the weighed combining of both stages $\hat{f}_i = \hat{f}_{i,1} + \beta_2 \cdot \hat{f}_{i,2}$. For an exemplary two-stage embodiment shown in FIG. 3, the estimated frequency 202 is a combined output $\hat{f}_i$ based on the first output $\hat{f}_{i,1}$ 235 and a weighted second output $\beta_2 \cdot \hat{f}_{i,2}$.

A Systems Analysis of an Exemplary Two-Stage NBI Detector in WiMedia MB-OFDM UWB System Referring to the exemplary embodiment of an NBI frequency detector 200 as shown in FIG. 3, computational processes otherwise expressed as complex equations as follows can be described for such exemplary stages, units or process elements amenable to systems implementation and analysis as exemplified. Such computational processes as otherwise expressed in analytical expressions can be variously implemented in systems and discrete logic, such as digital or analog logic for signal processing, or as executable instructions of a computer program or program product embodied in any computer readable medium for use by or in connection with an instruction execution system, apparatus, or device, such as a computer-based system, digital signal processor, ASIC or FPGA devices, or other processors or systems that can fetch the instructions from the instruction execution system, apparatus, or device and execute the instructions.

As used here, a "computer readable medium" can be any readable medium for use by or in connection with the instruction execution system, apparatus, or device. The computer readable medium can be based on a system, apparatus, device, or a removable storage device; and can include an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

As shown in FIG. 3, an exemplary embodiment of an NBI frequency detector 200 is used to output an estimate 202 of the NBI frequency $\hat{f}_i$, wherein a sampled received NBI signal 201 can be represented as $\tilde{I}[m] = I(m) + v(m)$, where $I[m] = A_i b[m] \exp(j(2\pi f_i mT + \phi_i))$ is the discrete narrow band signal and v[m] is the discrete noise sample with the variance of $\sigma^2$. Note the UWB signal is considered a component in v[m]. Other noise includes thermal noise.

The autocorrelation (e.g., an output 219 based on a first ACF unit 210) of the $1^{st}$ stage, amenable to computational logic for signal processing, can be expressed as $$ACF(m:M,1) = \sum_m \tilde{I}[m]\tilde{I}[m+1] = \sum_m A_i^2(b^*[m]b[m+1])e^{j2\pi f_i T} + v_{i,1}$$ where $$v_{i,1} = \sum_m I^*[m]v[m+1] + \sum_m I[m]v^*[m+1] + \sum_m v^*[m]v[m+1]$$ is the composite noise term. Since the coherent time of NB signal $T_i \gg T$, $b^*[m]b[m+1] \approx |b[m]|^2$. The NBI frequency estimation (e.g., the output 235 represented by $\hat{f}_{i,1}$ based on an angular function 233) at the first stage is thus given by $$\hat{f}_{i,1} = \frac{1}{2\pi T}\arg\left\{\sum_m \tilde{I}[m]\tilde{I}[m+1]\right\}$$

In the $2^{nd}$ stage, let $K_2=10$ for example. Taking an example of $1/T=528$ MHz, we have $B_{i,max}=52.8$ MHz, which holds for most existing narrowband systems. The $2^{nd}$ stage ACF output (e.g., an output 229 based on a $2^{nd}$ ACF unit 220), amenable to computational logic for signal processing, can be expressed as $$ACF(m:M,K_2) = \sum_m \tilde{I}[m]\tilde{I}[m+K_2] = \sum_m A_i^2(b^*[m]b[m+K_2])e^{j2\pi f_i K_2 T} + v_{i,K2}.$$

Again, $v_{i,k2}$ is the composite noise term and the NB signal is still coherent with lag of $K_2$ and therefore $b^*[m]b[m+K_2] \approx |b[m]|^2$.

Rotating (e.g., a complex exponential 232 driving a complex multiplier 250) the $2^{nd}$ stage ACF output by $\exp(-j2\pi K_2 T\hat{f}_{i,1})$, the phase of the rotated vector is $2\pi K_2 T(f_i-\hat{f}_{i,1})$. The corresponding estimation (e.g., the output 236 represented by $\hat{f}_{i,g}$ based on an angular function 234) on the residue $\hat{f}_{i,2}=f_i-\hat{f}_{i,1}$ is thus given by $$\hat{f}_{i,2} = \frac{1}{2\pi K_2 T}\arg\left\{\sum_m \tilde{I}[m]\tilde{I}[m+K_2]\exp(-j2\pi \hat{f}_{i,1}K_2 T)\right\}$$

The frequency estimate 202 of the two-stage NBI detector is given as $\hat{f}_i=\hat{f}_{i,1}+\beta_2\cdot\hat{f}_{i,2}$. If we let $\beta_2=1$ (as represented by $\beta_2$ 231), the estimated frequency 202 becomes $\hat{f}_i=\hat{f}_{i,1}+\hat{f}_{i,2}$.

Figure 4:
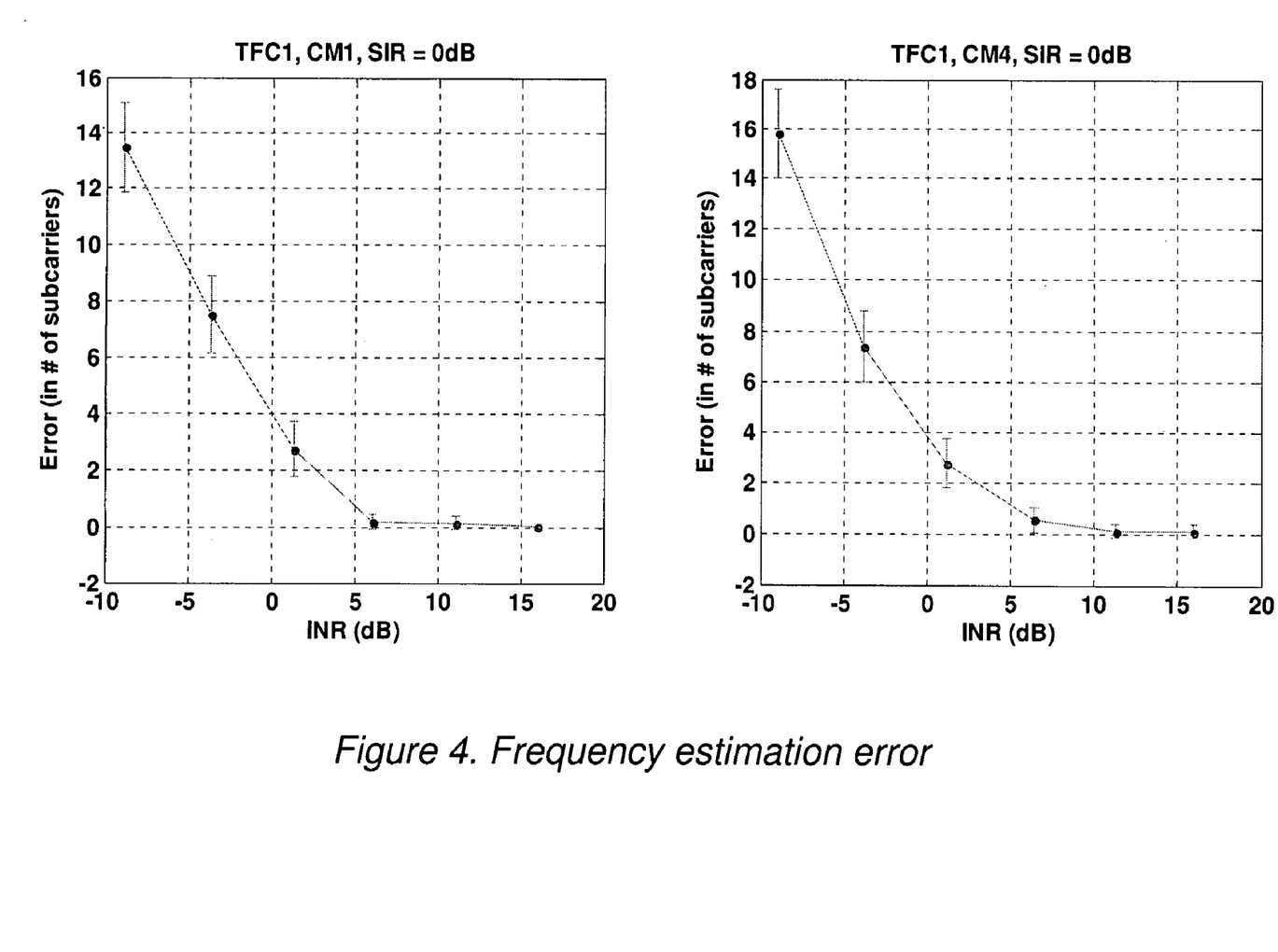
FIG. 4 shows the simulated results of the performance of the exemplary embodiment of an NBI detector.

Systems Embodiments, Results and Effects of Frequency Estimation for a WiMedia's MB-OFDM UWB System Table 1 and FIG. 4 show the frequency estimation error under different interference to noise ratio (INR) for a WiMedia MB-OFDM UWB system. In the simulation, M=160, $K_2=10$ (therefore $B_{i,max}=52.8$ MHz). $\beta_2$ is set to 1. The estimation error is normalized to subcarrier spacing (i.e., 4.125 MHz). The results show that for INR at 1 dB, the frequency estimation error is less than 3 subcarriers with 95% confidence. For INR of 5 dB or higher, the frequency estimation error is within 1 subcarrier with 95% confidence.

TABLE 1

Simulation results of frequency estimation error

| INR (dB) | in CM1 Channels | in CM4 Channels |
|---|---|---|
| −9 | 13.4311 ± 1.6290 | 15.8030 ± 1.8229 |
| −4 | 7.5120 ± 1.3621 | 7.4037 ± 1.3976 |
| 1 | 2.7367 ± 0.9576 | 2.7944 ± 0.9604 |
| 6 | 0.1887 ± 0.2503 | 0.5744 ± 0.4905 |
| 11 | 0.1566 ± 0.2515 | 0.1579 ± 0.2512 |
| 16 | 0.0186 ± 0.0015 | 0.1470 ± 0.2513 |

Figure 5:
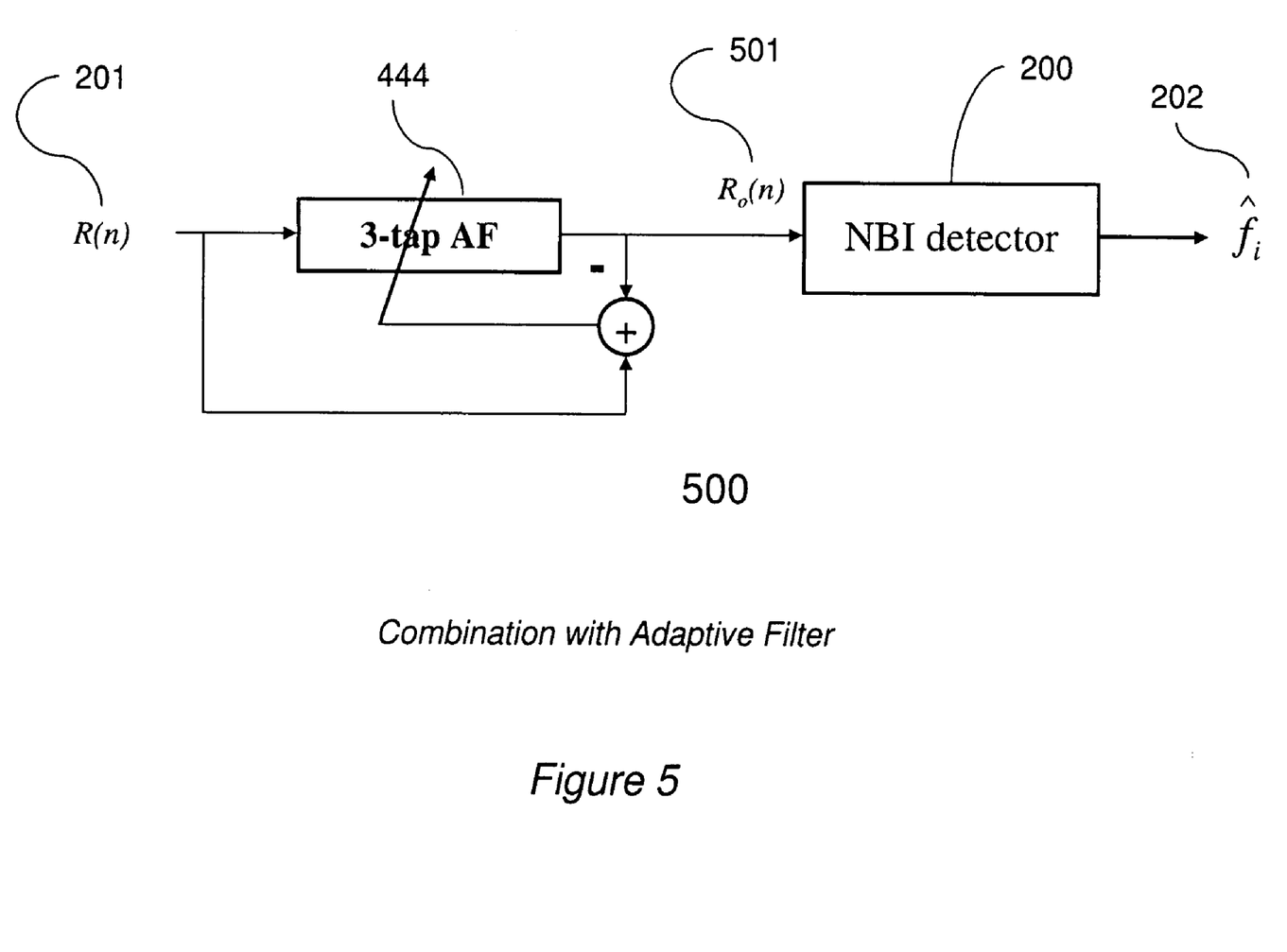
FIG. 5 shows an exemplary embodiment which combines an NBI detector with an adaptive filter (AF) to further improve the frequency estimation accuracy.

FIG. 5 illustrates an exemplary embodiment 500 of the disclosed structure in which a NBI detector 200 is used in combination with a 3-tap adaptive filter 444. Although a 3-tap adaptive filter 444 is exemplified, a larger multi-tap adaptive filter can be used. As shown, the discrete received signal R(n) is split into two signal paths, the first path being processed by a 3-tap adaptive filter 444 and the second path leading to an adder. The difference between the second path R(n) and the adaptively filtered path $R_o(n)$ results in an error signal which is used in the feedback loop to adapt the 3-tap adaptive filter 444 based on parameter settings to emphasize the NBI signal and suppress the UWB signal level of the resulting adaptively filtered signal $R_o(n)$. The signal $R_o(n)$ is fed to the NBI detector 200 to yield an estimated frequency $\hat{f}_i$. This allows the NBI detector to estimate the NBI frequency more accurately.

Figure 6:
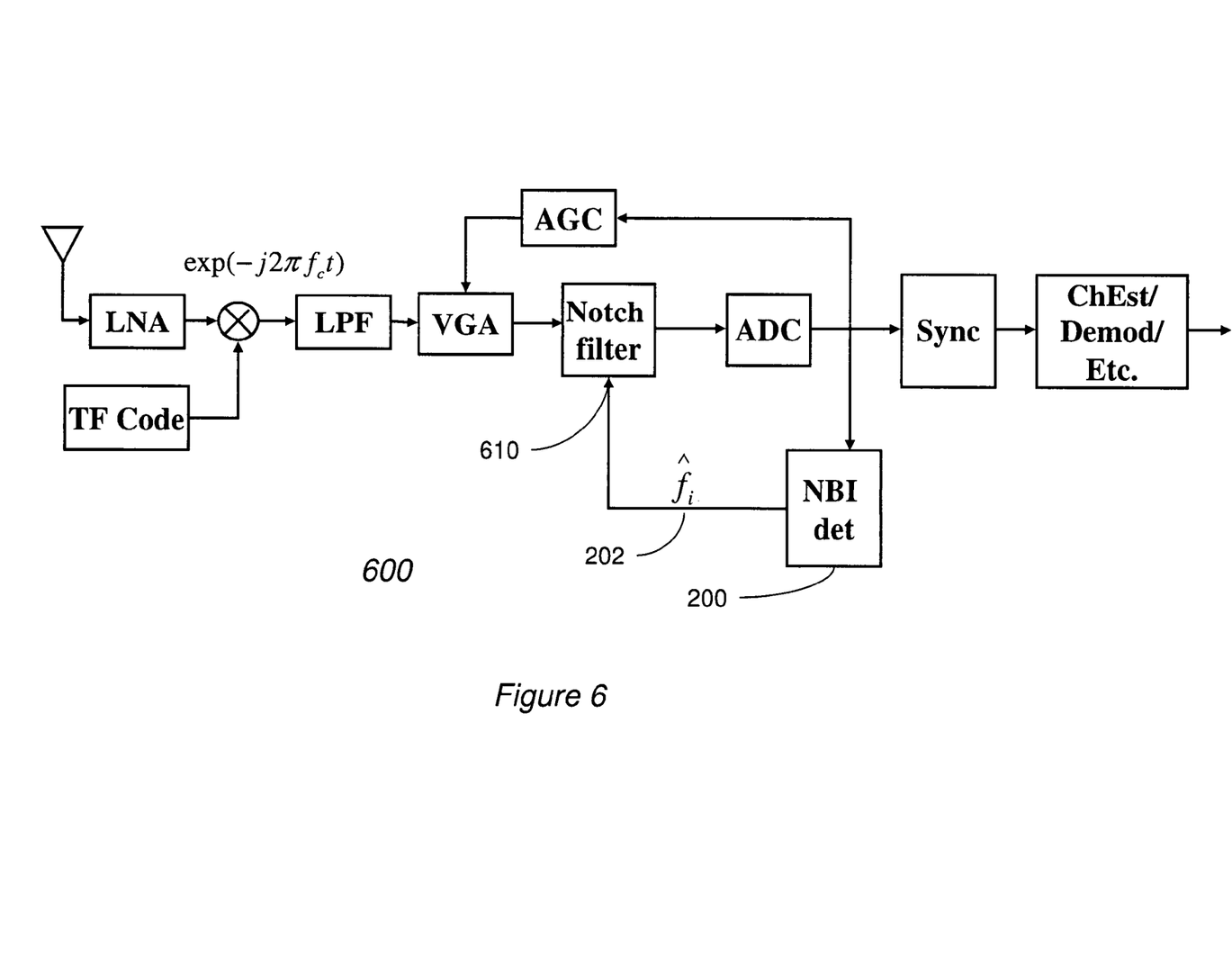
FIG. 6 shows a UWB receiver 600 equipped with an exemplary embodiment of an NBI detector and an adjustable notch filter.

FIG. 6 gives an example of a UWB receiver 600 equipped with an exemplary embodiment of an NBI detector 200 and an adjustable notch filter 610. The estimated frequency 202 by the NBI detector is used to tune an adjustable/programmable notch filter. The combination of the NBI detector 200 and the adjustable notch filter 610 can remove or reduce the power level of the narrow band interference with arbitrary frequency while letting the UWB signal pass through. Even though in the example in FIG. 6 a baseband notch filter is used, it is possible to use a notch filter in RF band and still achieve the same objective of suppressing the NBI. The NBI detector 200 and the adjustable notch filter 610 can cancel/suppress NBI adaptively.

The exemplary NBI detection method can also be used to facilitate the implementation of Detect And Avoid (DAA) in a UWB system. In a DAA enabled systems, UWB nodes need to detect the presence of the narrow band signals and must avoid transmitting in the same frequency as the narrow band signals. For example, in an MB-OFDM UWB system with NBI detection capability, once a node detects the NBI and its frequency, it makes sure the corresponding tones are nullified in its own transmitted signal. It can also send this NBI frequency information to other UWB devices in the system so other nodes also nullify the tones. Such a further exemplary NBI detection method is also encompassed by the present disclosure.

Figure 7:
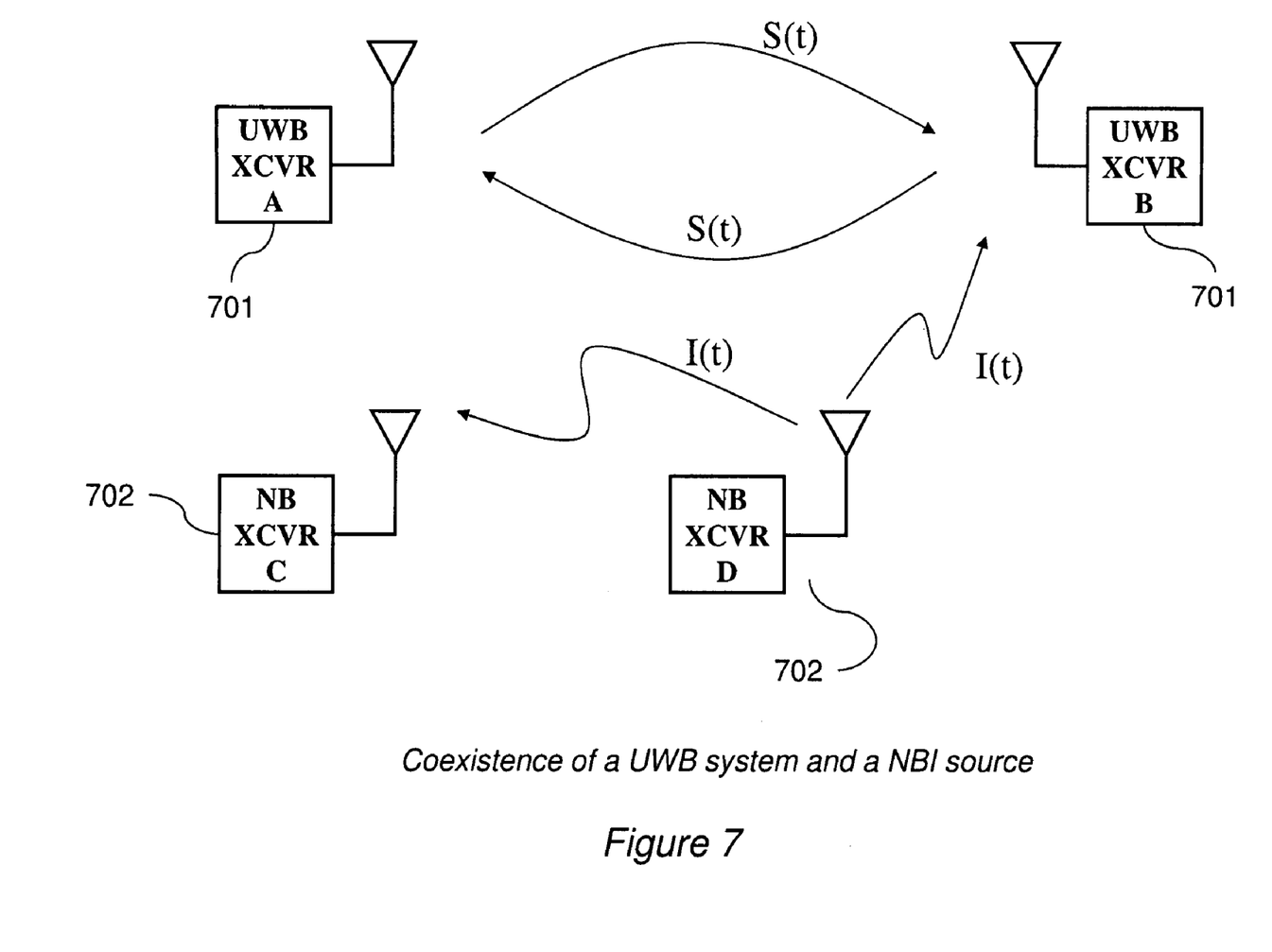
FIG. 7 show a UWB system and a NB system colocated with each other, wherein the narrow band system signal is I(t) and the UWB signal is S(t).

FIG. 7 show an example of a UWB system and a NB system colocated with each other. The narrow band system signal is I(t) and the UWB signal is S(t). In the example, the UWB nodes 701 communicate with each other by transmitting UWB signals S(t). The narrow band nodes 702 communicate with each other by transmitting narrow band signal I(t). I(t) is narrow band interference to the UWB transceivers 701. S(t) becomes interference to the narrow band transceiver 702.

The various exemplary methods can reliably estimate the frequency of narrow band interference accurately with high confidence, especially at high interference to noise ratio.

The various exemplary methods can operate in the time domain and therefore can respond faster to NBI than known methods that require operations in the frequency domain.

The various exemplary methods can reduce the effect of narrow-band interference on the performance of a UWB system.

The various exemplary methods can facilitate the detection and avoidance (DAA) implementation in UWB systems.

The various exemplary methods can be implemented in hardware with low complexity, resulting in low energy consumption.

Although the disclosure has been described by way of examples of exemplary embodiments, it is to be understood that various other adaptations and modifications can be made within the spirit and scope of the invention. Therefore, it is the object of the appended claims to cover all such variations and modifications as come within the true spirit and scope of the invention.

What is claimed is:

1. A computational method for narrow-band interference detection based on discrete signal processing in a radio frequency receiver, the method comprising:
   initially estimating, via a first autocorrelation function (ACF) unit, a narrow-band interference frequency in a narrow-band interference frequency detector using a first stage of a multi-stage autocorrelation-function applied to an input signal;
   estimating, via a second ACF unit, at least one residue frequency based on at least one other autocorrelation stage of the multi-stage autocorrelation-function, the input signal and the initial frequency estimate; and
   combining the results of multiple stages of the multi-stage autocorrelation-function for final estimation, wherein
   the final estimation produces an estimate of the narrow-band interference frequency based on the combined results of the multi-stage autocorrelation-function,
   the initial frequency estimate of the first autocorrelation stage is computationally expressed as $$\hat{f}_{i,1} = \frac{1}{2\pi T}\arg\{ACF(m; M, 1)\}$$

wherein $\arg\{ACF(m; M,1)\}$ is the angular function that returns the angle of a complex number, and wherein $ACF(m;M,1)$ is the autocorrelation function (ACF) defined as $$ACF(m; M, 1) = \sum_{l=0}^{M-1} R(m+l)R^*(m+l+1)$$

where $R(m+l)$ is a discrete received signal R at time instant $m+l$, m being an index of a first sample in a first segment, and l being an offset index; $(\ )^*$ denotes a conjugation operator; and M is summation window size of the ACF.

2. The method according to claim 1, wherein the narrow-band interference frequency being estimated is a center frequency of the narrow-band interference.

3. The method according to claim 1, wherein each stage of the multi-stage autocorrelation-function is based on processing an autocorrelation-function computing operation on a received signal.

4. A narrow band interference estimator apparatus based on a hardware implementation of a process embodying the method according to claim 1.

5. The narrow band interference estimator according to claim 4, further includes an adaptive filter combined with the narrow band interference estimator.

6. A multi-stage narrow band interference frequency detector comprising:
   a first autocorrelation stage to produce, via a first autocorrelation function (ACF) unit, an initial frequency estimate of a narrow band interference based on an input signal; and
   at least one other autocorrelation stage to estimate, via a second ACF unit, a residue frequency based on the input signal and the initial frequency estimate, wherein an output estimate $\hat{f}_i$ of the multi-stage narrow band interference frequency detector is based on a combination of the initial frequency estimate of a narrow band interference and the at least one estimate of the residue frequency, wherein
   the residue frequency estimate of the at least one other autocorrelation stage g, where g>1, is computationally expressed as $$\hat{f}_{i,g} = \frac{1}{2\pi K_g T}\arg\left\{ACF(m; M, K_g)\exp\left(-j2\pi K_g T\sum_{n=1}^{g-1}\hat{f}_{i,n}\right)\right\}$$

where $$\arg\left\{ACF(m; M, K_g)\exp\left(-j2\pi K_g T\sum_{n=1}^{g-1}\hat{f}_{i,n}\right)\right\}$$

is the angular function that returns the angle of a complex number; $ACF(m;M,K_g)$ is the autocorrelation function (ACF) defined as $$ACF(m; M, K_g) = \sum_{l=0}^{M-1} R(m+l)R^*(m+l+K_g)$$

where $R(m+l)$ is a discrete received signal R at time instant $m+l$, m being an index of a first sample in a first segment, and l being an offset index; $(\ )^*$ denotes a conjugation operator; $K_g$ is the "lag" of stage g; and M is summation window size of the ACF.

7. The multi-stage narrow band interference frequency detector according to claim 6, wherein the lag $K_s$ of the final stage ($K_g$, where g=S) satisfies $\max(B_i)<1/K_s T$; $\max(B_i)$ indicates a maximum bandwidth of the detectable narrow band interference;
   and the lag $K_g$ of stage g increases with the value of g.

8. A multi-stage narrow band interference frequency detector comprising:
   a first autocorrelation stage to produce, via a first autocorrelation function (ACF) unit, an initial frequency estimate of a narrow band interference based on an input signal; and
   at least one other autocorrelation stage to estimate, via a second ACF unit, a residue frequency based on the input signal and the initial frequency estimate, wherein an output estimate $\hat{f}_i$ of the multi-stage narrow band interference frequency detector is based on a combination of the initial frequency estimate of a narrow band interference and the at least one estimate of the residue frequency, wherein a sampled baseband signal is used as the input signal and has a sampling interval of $T=I/B_u$ wherein $B_u$ is Bandwidth, the output estimate $\hat{f}_i$ of the multi-stage narrow band interference frequency detector is a weighted combination of the initial frequency estimate of a narrow band interference and the at least one estimate of the residue frequency, and a center frequency narrow band interference can be any value in the range $[-B_u/2, B_u/2]$.

* * * * *